United States Patent
Vankov et al.

(10) Patent No.: US 7,843,840 B2
(45) Date of Patent: Nov. 30, 2010

(54) TRAFFIC INDEPENDENT SURVIVABILITY ANALYSIS

(75) Inventors: Vanko Vankov, San Francisco, CA (US); Arun Pasupathy, Gaithersburg, MD (US); Vinod Jeyachandran, Rockville, MD (US); Pradeep K. Singh, McLean, VA (US); Alain J. Cohen, McLean, VA (US); Yonghuan Cao, Morrisville, NC (US)

(73) Assignee: OPNET Technologies, Inc., Bethesda, MD (US)

( * ) Notice: Subject to any disclaimer, the term of this patent is extended or adjusted under 35 U.S.C. 154(b) by 170 days.

(21) Appl. No.: 12/195,393

(22) Filed: Aug. 20, 2008

(65) Prior Publication Data
US 2009/0052333 A1     Feb. 26, 2009

Related U.S. Application Data

(60) Provisional application No. 60/968,024, filed on Aug. 24, 2007.

(51) Int. Cl.
*G06F 11/30* (2006.01)

(52) U.S. Cl. ....................... 370/242; 709/224

(58) Field of Classification Search ............ 370/252, 370/253, 392; 703/13, 14, 21; 709/226
See application file for complete search history.

(56) References Cited

U.S. PATENT DOCUMENTS

| | | | |
|---|---|---|---|
| 5,809,282 A * | 9/1998 | Cooper et al. ............ 709/226 |
| 6,570,867 B1 * | 5/2003 | Robinson et al. ............ 370/351 |
| 6,654,803 B1 * | 11/2003 | Rochford et al. ............ 709/224 |
| 2003/0061017 A1 * | 3/2003 | Dotaro et al. ............ 703/14 |
| 2004/0073655 A1 * | 4/2004 | Kan et al. ............ 709/224 |
| 2004/0122645 A1 * | 6/2004 | Shevenell et al. ............ 703/21 |
| 2005/0073961 A1 * | 4/2005 | Paik et al. ............ 370/252 |
| 2007/0025355 A1 * | 2/2007 | Cohen et al. ............ 370/392 |
| 2008/0040088 A1 * | 2/2008 | Vankov et al. ............ 703/13 |

* cited by examiner

*Primary Examiner*—Albert T Chou
(74) *Attorney, Agent, or Firm*—Robert M. McDermott, Esq.

(57) ABSTRACT

First-order effects of hypothesized fault conditions are determined by propagating discrete test packets between select nodes and noting the change of path, if any, taken by the test packet under each condition relative to the fault-free path. Tools are provided to create classes of node pairs of interest, and test packets are created only for select classes. The network is analyzed to identify fault conditions that are likely to impact system performance, and only these fault conditions are simulated. By providing a methodology for selecting classes of node pairs to test, and prioritizing the faults to simulate, a first-order survivability analysis of large networks can be performed efficiently and effectively. The efficiency of this technique is also enhanced by providing test packets that are representative of a wide range of possible source-destination combinations, and by evaluating only the source-destination combinations that may be directly affected by each fault condition.

40 Claims, 3 Drawing Sheets

FIG. 1

| Select all interfaces matching the following criteria: | | |
|---|---|---|
| Parameter | Matches | Match as |
| Node Name | SP* | Regular Expression |
| Interface Name | Serial_2 | String |
| IP Address | 172.16.0.0/16 | IP Subset |
| Interface Type | Tunnel | |
| | | |

FIG. 2A

| Source | Destination | Include? | Parameters |
|---|---|---|---|
| 172.16 | 172.16 | No | <Edit> |
| 172.16 | Loopbacks on edge nodes | No | <Edit> |
| 172.16 | All Connected Interfaces | Yes | <Edit> |
| Loopbacks on edge nodes | 172.16 | No | <Edit> |
| Loopbacks on edge nodes | Loopbacks on edge nodes | Yes | <Edit> |
| Loopbacks on edge nodes | All Connected Interfaces | No | <Edit> |
| All Connected Interfaces | 172.16 | No | <Edit> |
| All Connected Interfaces | Loopbacks on edge nodes | No | <Edit> |
| All Connected Interfaces | All Connected Interfaces | No | <Edit> |

FIG. 2B

| [+] | Ports | | <...> |
|---|---|---|---|
| [-] | SLA Parameters | | <...> |
| | | Delay (seconds) | 0.5 |
| | | Hop Count | 5 |
| | | Traversal of Over-Utilized Links | Consider |
| [-] | Traffic Parameters | | <...> |
| | | Type of Service | 0 |
| | | Average Packet Size | Default |

FIG. 2C

| Criteria for Affecting Test Packets | Threshold | Enabled |
|---|---|---|
| End-to-end delay in failure case exceeds baseline by (%) | 50.0 | Yes |
| Number of hops in failure case exceeds baseline by (%) | 100.0 | Yes |
| Routability in failure case differs from baseline | | Yes |
| Traversal of overutilized link | | Yes |

TRAFFIC INDEPENDENT SURVIVABILITY ANALYSIS

This application claims the benefit of U.S. Provisional Patent Application 60/968,024, filed 24 Aug. 2007.

BACKGROUND AND SUMMARY OF THE INVENTION

This invention relates to the field of network analysis, and in particular to a method and system for assessing the survivability of a network under a variety of fault conditions.

Network simulators are commonly used to assess the effects of changes to an existing network. Proposed additional equipment to the network can be simulated on a model of the network to determine whether the addition achieves the intended goals; possible additional traffic demands can be simulated to determine the degradation of service that can be expected; modified configurations can be simulated to determine whether the modification improves or degrades the network's performance; and so on. In each of these scenarios, models of the traffic being handled, or expected to be handled, are used to simulate the operation of the network with the given traffic.

Network simulators are also commonly used to perform survivability analysis, to determine how well the network performs when faults occur. For such an analysis, the traffic models are simulated on the network model in a fault-free condition to establish a performance baseline, then the network model is modified to represent a given fault, and the same simulation is performed to determine the degradation in performance, if any, caused by the fault. In the presence of a fault, traffic on the network is automatically re-routed as required and as feasible, which will generally increase the length of the route between affected nodes, and causing the load at the nodes and links along the re-routed path to increase, which increases the level of congestion and consequential delays on other routes.

This process is repeated for each of a variety of hypothesized fault conditions, and the performance under each fault condition is recorded. By assessing the performance of the network under a variety of fault conditions, faults that produce substantial performance degradation can be identified, and measures taken to modify the system to reduce such degradations and thereby enhance the system's ability to perform satisfactorily should such a fault actually occur.

The simulation of modeled traffic on large network models generally consumes a substantial amount of time, and the repeated simulations for each hypothesized fault condition for a survivability analysis is very often infeasible. Also, because the testing of hypothesized fault conditions cannot be exhaustive, particularly in large networks, conventional fault analysis methods generally include a random selection of fault conditions to simulate, and/or require the user to specifically identify each particular fault conditions of interest.

Additionally, it is often the case that traffic models are not available and/or difficult to obtain. Network models are often used to perform 'reachability' analyses, to verify that the nodes in the network are able to communicate with each other, without regard to the actual traffic loads, and/or to perform security analyses, to verify that any communication restrictions are enforced by the elements of the modeled network. In these situations, without traffic models, conventional survivability analysis cannot be performed.

It would be advantageous to be able to perform survivability analysis without incurring the time demands of conventional network simulations. It would also be advantageous to be able to perform survivability analysis without requiring traffic models. It would also be advantageous to allow for targeted survivability analysis within large networks.

These advantages, and others, can be realized by providing a method and system that determines the first-order effects of fault conditions by propagating discrete test packets between select nodes and noting the path taken by the test packet under normal and faulted conditions. Tools are provided to create classes of node pairs of interest, and test packets are created only for select classes. The network is analyzed to identify fault conditions that are likely to impact system performance, and only these fault conditions are simulated. By providing a methodology for selecting classes of node pairs to test, and prioritizing the faults to simulate, a first-order survivability analysis of large networks can be performed efficiently and effectively. The efficiency of this technique is also enhanced by providing test packets that are representative of a wide range of possible source-destination combinations.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions. The drawings are included for illustrative purposes and are not intended to limit the scope of the invention.

DETAILED DESCRIPTION

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

This invention is premised on the observation that attempting to perform an exhaustive survivability analysis on large networks using models of the traffic on the network is generally infeasible, and a random selection of fault conditions to model is rarely effective for determining where improvements to the network are required. As an alternative to simulating the network using traffic models that imitate the variety of traffic flows across the network to determining the variety of effects caused by a fault condition, each route of interest is evaluated substantially independently to estimate/determine the 'first-order' effects of the fault condition. As used in this disclosure, a first-order effect of a fault is a change of routing path between nodes. That is, as contrast to traffic-based simulations of faults, which determines the change of routing and the consequential affects of these changes, the inventors have recognized that a substantial amount of information can be obtained regarding the robustness of the network, and the nodes or links that should be improved, by assessing the change of routing, without regard to the details of how a particular change of routing affects other nodes, and without regard to the details of the particular flows across the links.

By determining a change of routing, a number of key performance parameters can be determined/estimated. Of particular note, a change of routing may introduce additional routing or switching nodes (hops) along the path between the source and destination, which could be indicative of potential performance degradation. In like manner, the cumulative delay along the new path can be estimated, based on the nominal delay parameters associated with each node and link along the path. Additionally, as routes are changed, the number of routes that use any given link can change, and a large number of routes on a link can be indicative of an over utilization of that link.

Although not as detailed or as precise as an assessment based on actual flows through the network, these first-order effects of an increased number of hops and/or an increased delay across a route between two interfaces and/or an increased utilization of a link, have been found to be particularly well suited for assessing a network's survivability and identifying areas that are likely candidates for improving the network's survivability, and are determinable based only on a determination of the change of routing incurred by each failure condition.

This invention is also premised on the observation that, in many cases, a network manager can identify classes of communication interfaces of interest, such as only IP-capable interfaces, or only interfaces that include tunnels, and so on, depending upon the particular network, or the particular problem being addressed. In these situations, it would be preferable to determine the survivability of the network with regard to these select classes, and eliminate the assessment of survivability with regard to classes of no interest to the current analysis.

In like manner, although specific traffic flows are not used to determine the effects of each fault, heuristics can be applied to determine which nodes or links are more likely to impact the network's performance than others, such as links that support multiple routing paths, links related to the aforementioned interface classes of interest, and so on, to provide a more meaningful analysis than a random selection of nodes or links to fail.

Further, it is observed that once the interfaces to be tested and fault conditions to be modeled are determined, individual test packets can be created to efficiently determine the effect of each fault on communications to/from each selected interface without simulating the actual traffic flow through the network, and without simulating each source-destination combination associated with the interfaces of interest.

Figure 1:
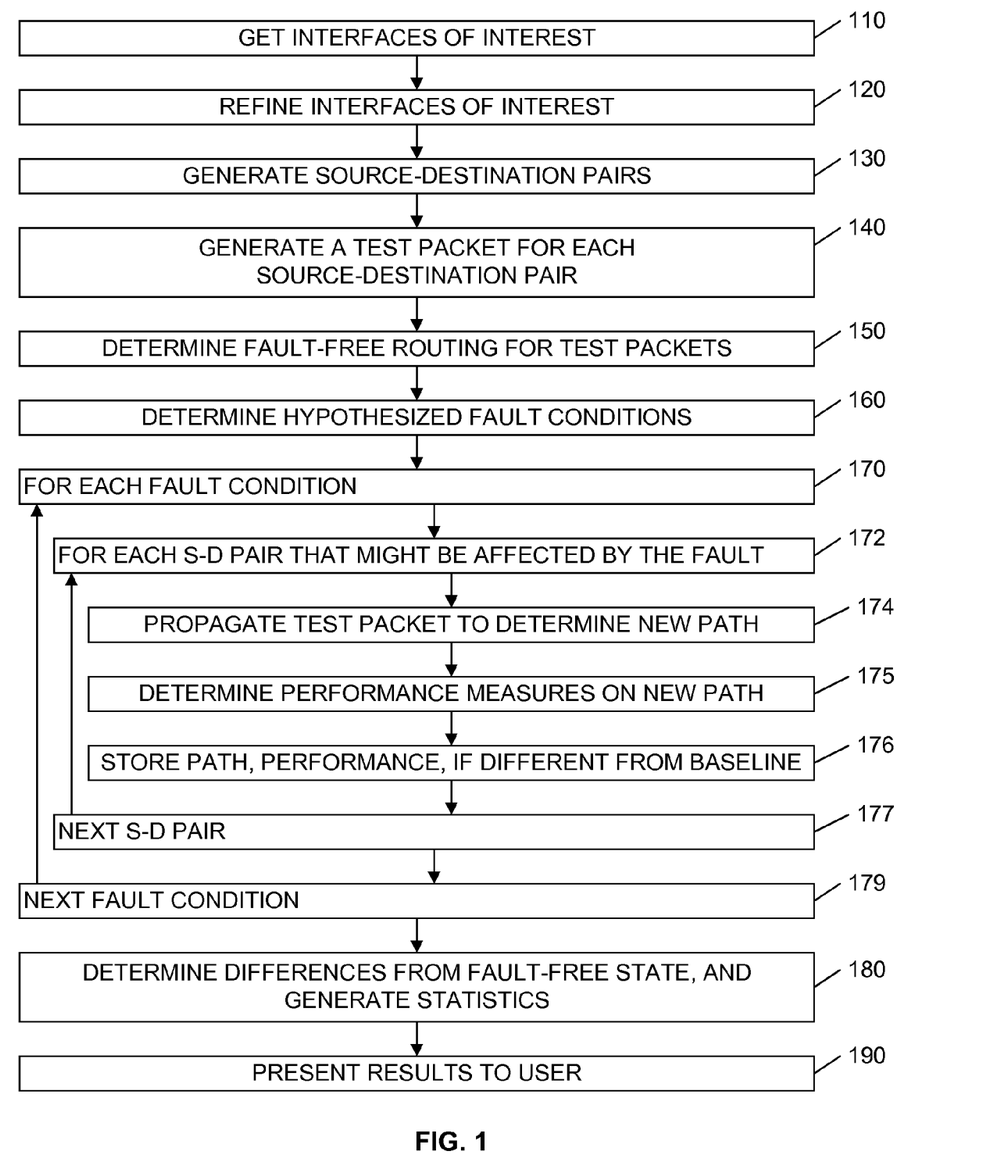
FIG. 1 illustrates an example flow diagram for conducting a survivability analysis in accordance with this invention.

FIG. 1 illustrates an example flow diagram that outlines the major phases of survivability analysis in accordance with this invention. At 110, the interfaces of interest are identified, and at 120, the selection of these interfaces is optionally refined.

At 130, interface-pairs are generated, including an identification of each unique source-destination combination within the range of addresses of each interface in the pair.

At 140, a test packet is generated for each source-destination pair.

At 150, the fault-free routing between each unique source-destination combination is determined by propagating the test packet from the source to the destination. The path of each route is recorded for each source-destination pair, and is subsequently used to provide a selective simulation of only the pairs that are affected by each hypothesized fault condition. The first-order performance measures associated with each pair, based on the path of each route, such as the aforementioned number of hops along the path, and the cumulative delay along the path, are stored for the fault-free configuration, as a baseline.

At 160, the fault conditions that are to be simulated are generated, based on characteristics that are correlated to the likelihood of impacting performance if the fault occurs, such as the number of paths of interest that would be affected by the fault.

In the loop 170-179, each fault condition is modeled, and the effects of each fault on each selected source-destination pair is determined by noting any changes to the path taken under the fault condition. Based on the path, the first-order performance measures for each pair under each failure condition is determined and recorded.

At 180, the performance measures for each pair and each failure condition are compared to the performance measures recorded for the fault-free network, and corresponding statistics are determined.

At 190, these statistics, and underlying details, are presented to the user.

The following paragraphs detail example techniques for embodying each of the blocks of FIG. 1, although one of skill in the art will recognize that alternative techniques may be used in view of this disclosure.

At 110, the interfaces of interest are identified by providing options to a user. In addition to allowing the user to identify specific interfaces of interest, a preferred embodiment allows the user to define 'classes' of interfaces. Two classes of interest that appear to be effective for survivability analysis of typical large networks are: all IP-nodes in a network, and all edge nodes of a network. Predefined and custom-designed rules can be defined for identifying membership in each class. For example, because edge nodes are not typically expressly identified in network configuration files or corresponding network models, a heuristic rule, such as a rule based on the number of connected links on a node, can be used to classify a node as an edge node, and the threshold number of connected links can be defined by each user.

At 120, the selection/classification of these interfaces is optionally refined. For example, rules can be defined to identify which interface(s) on the nodes in the class is the default interface for assessment, such as the "loopback" interface. In like manner, other classes and sub-classes may be defined, as detailed further below.

Figure 2A:
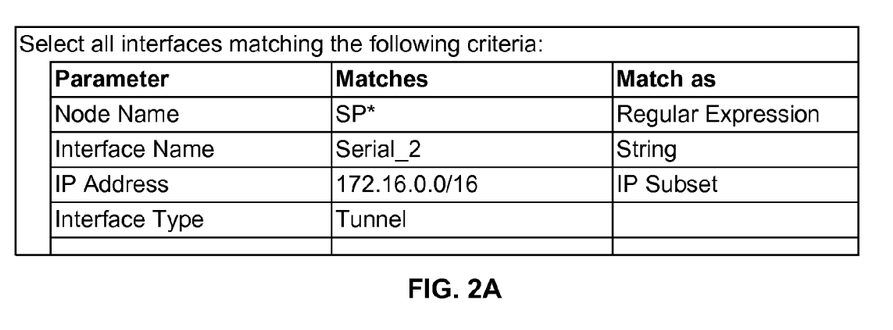
FIGS. 2A-2C illustrate example user interface windows for controlling a survivability analysis in accordance with this invention.

FIG. 2A illustrates an example user interface for refining the selection of IP interfaces. The parameters of an IP interface are itemized in the first column, and the user is given the option of defining a parameter value and a criteria for matching each parameter. All interfaces that satisfy the combination of parameter values are selected for use during the subsequent survivability analysis. In a preferred embodiment, the selection can be further manipulated by allowing the user to add/remove interfaces/IP addresses manually from the selection.

At 130, interface-pairs are generated, including an identification of each unique source-destination combination within the range of addresses of each interface in the pair. In most cases, a full mesh of the interfaces in the select class(es) defines the set of communicating interface-pairs, although the user is provided the option of selecting particular interface pairs. In a preferred embodiment, the user may predefine common classes of interfaces, then selectively include or exclude sets of interface pairs for a particular analysis.

Figure 2B:
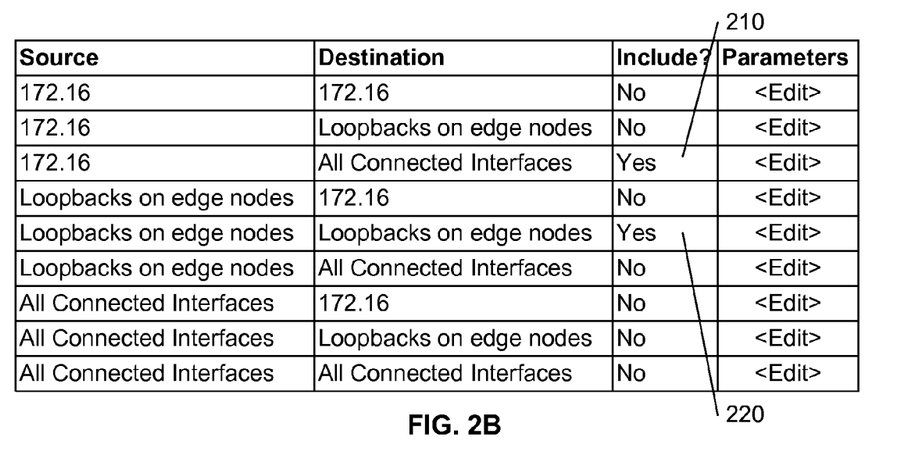

FIG. 2B shows a user interface that lists example sets of IP interfaces that the user has selected, corresponding to the selection of all interfaces with an IP address beginning with "176.16", all loopback interfaces on all edge nodes; and all connected interfaces. In FIG. 2B, the nine permutations of these three interfaces as source and destinations are listed, and the user is given the option of including or excluding the corresponding sets of interface pairs. In this example, the user has selected to include the interface pairs corresponding to all the interfaces with an IP address beginning with "176.16" and all other connected interfaces, at 210, as well as all loopback interfaces on all edge nodes with all other loopback interfaces on all edge nodes (a full mesh of loopback interfaces on edge nodes).

Also illustrated in FIG. 2B, the user is provided the option of further specifying ranges of parameters for these interface pairs, by selecting the 'edit' box for the set of interface pairs. These specified parameters include both parameters that further refine the membership in the selected interface-pair, and threshold parameters that define potential problem areas.

Figure 2C:
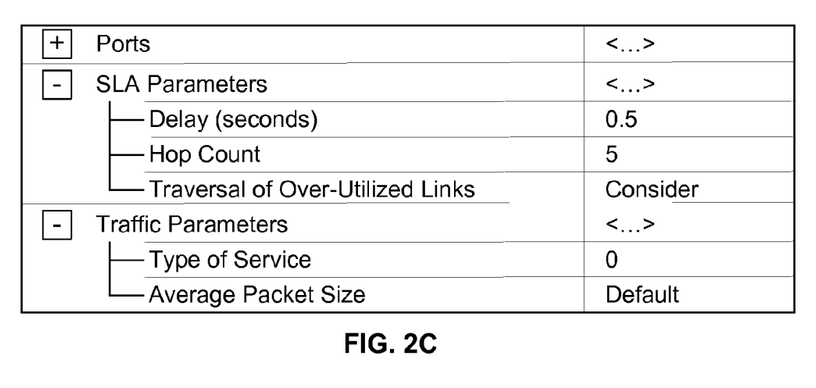

FIG. 2C provides an example user interface for editing parameters for a selected set of interface-pairs. The "Ports" parameter in FIG. 2C allows the user to limit the survivability analysis to selected ports of interest within the set of interface-pairs, by selecting the " . . . " icon at the "Ports" line. In like manner, other parameters, such as the type of protocol used, and others, can also be selected by the user for inclusion in the survivability analysis.

Also illustrated in the interface of FIG. 2C are parameters associated with Service Level Agreements (SLA). With an SLA, an inability to achieve a specified level of performance is deemed a failed communication, regardless of how far off the particular measure may be. In a preferred embodiment of this invention, other first-order effects include such failed communications, as well as inability to communicate (destination is not reachable from the source). In the example of FIG. 2C, the SLA maximum delay of 0.5 seconds is set for the cumulative delay from source to destination, and five hops is set as the maximum number of hops required by the new path. In like manner, the routing of the source-destination pair to an oversubscribed link constitutes a failed communication. If the new path exceeds any of the specified thresholds, the fault condition is considered to have produced a communications failure, which is generally significant in the assessment of the effects of the faults, as discussed further below.

Having defined the sets of interface-pairs of interest, with optional further refinements as discussed above, these sets of interface-pairs are assessed to determine whether the addresses associated with each interface-pair are distinguished with regard to access policies or rights. That is, for example, in assessing the interface beginning with "176.16" at a given node, there are 2^16 different IP addresses (176.16.0.0 through 176.16.255.255) and 2^32 different port addresses associated with this defined interface, and the testing of all of these different addresses individually would be infeasible. However, if the routing of any one of these particular addresses is indistinguishable from the routing of any other particular address associated with this defined interface, the determination of a new path for a single address of the interface under a fault condition will define the routing effects caused by the fault to all the addresses of the defined interface. Conversely, if some of the addresses within the defined interface have different communication rights on the network, they may be routed differently, and should be distinguished from the other addresses.

In a preferred embodiment of this invention, each address-range of an interface that is subject to one or more different rules than another address-range at the interface is identified, and these distinguished address-ranges are used to generate the set of source-destination pairs that are subsequently included for testing under each fault condition. Copending USPA 2007/0282981, "AGGREGATING POLICY CRITERIA PARAMETERS INTO RANGES FOR EFFICIENT NETWORK ANALYSIS", filed 15 Apr. 2007 for Alain J. Cohen, Pradeep K. Singh, Ankit Agarwal, and Venuprakash Barathan, teaches techniques for creating sets of source-destination pairs based on communication access policies, and is incorporated by reference herein. In this copending application, the entirety of the address space associated with an interface is assessed to determine all of the sets of distinguished addresses; in this application, only the address space defined by the user's refinements of the selected interface classes need be assessed.

By distinguishing the address range to define each source-address pair based on communication access policies/rights, the propagation of a message with a single address within the determined range of the pair will necessarily undergo the same access restrictions as any other address within the range. Accordingly, the testing of a single address within the range of a given source-address pair will be sufficient for testing all of the addresses associated with that source-address pair.

At 140, a test packet is generated for each distinguished source-destination pair. This test packet will generally contain the same header information that a packet in the actual network would contain, so that the routing elements that determine the path of the packet in the network model will perform the same actions based on this information as the actual network would perform on an actual packet. Additionally, this test packet may contain other information to facilitate the survivability analysis. For example, the test packet may include a nominal packet size, to facilitate a determination of bandwidth-related delays along the route. In like manner, although this technique does not address the details of traffic flow over time, the test packet may include a nominal traffic load per unit time, and the elements in the network model can be configured to accumulate the load from all of the test packets that are handled by the element. In this manner, although the test packets only represent the traffic of the selected interface-pairs, a relative measure of traffic load at each network element can be estimated.

At 150, the fault-free routing between each unique source-destination combination is determined by propagating the test packet from the source to the destination. In addition to determining the aforementioned first-order performance measures associated with the fault-free network to use a baseline, the path of each fault-free route for each source-destination pair is recorded. As discussed further below, by knowing the fault-free path of each source-destination pair, when a fault condition is imposed at a node or link, only the source-destination pairs whose paths include the faulted node or link need to be re-simulated to determine the effects of the fault. Additionally, as discussed below, the accumulated utilization of each element of the network during this fault-free simulation of these test packets is recorded. If the test packets include nominal loads, the utilization would include the total load of each element, otherwise, the utilization may only include the number of source-destination paths traversing the element.

At 160, the fault conditions that are to be simulated are determined, preferably based on characteristics that are correlated to the likelihood of impacting performance if the fault occurs. For example, it can be reasonably assumed that the elements of the network that are most heavily utilized under fault-free conditions are likely to be the elements whose failure will cause the most impact. In a preferred embodiment, the user is given the option of creating a given number of fault conditions based on the aforementioned accumulated utilization of each element of the network. Alternatively, or additionally, the user can identify particular types of elements to be included or excluded from the generated set of fault conditions, such as links, nodes, interfaces, as well as select combinations of elements.

In the loop 170-179, each fault condition is modeled and its effect on each source-destination pair is determined.

As noted above, the fault free path of each source-destination pair is recorded when each test packet is propagated from source to destination, identifying each element lying along the path. This information is transformed to define, for each fault condition, all of the source-destination pairs whose path traverses the faulted element(s). That is, if the fault condition is a failed link, all of the source-destination pairs whose fault-free paths include the failed link are identified. If the fault condition is a failed router, all of the source-destination pairs whose fault-free paths include any interface on the failed router are identified.

The loop 172-177 determines the effect of the given fault condition on each of the identified source-destination pairs that can be affected by the fault. At 174, the test packet associated with the source-destination pair is propagated to determine the new path for this pair caused by the fault condition, and at 175, the first-order performance measures associated with this new path are determined and recorded if they differ from the fault-free baseline, at 176. Optionally, the new path may also be recorded to provide such information upon request by the user in the report-generation phase.

At 180, the recorded performance measures for each pair and each failure condition are compared to the performance measures recorded for the fault-free network, and corresponding statistics are determined. In a preferred embodiment of this invention, the user is provided the option of defining the types of failure effects that are considered significant. If a given source-destination pair does not experience a significant failure effect for a given fault condition, that pair is considered unaffected by the fault condition. In this manner, the statistics that describe the results of the survivability analysis need not include source-destination pairs that are unaffected by each fault condition.

Figure 3:
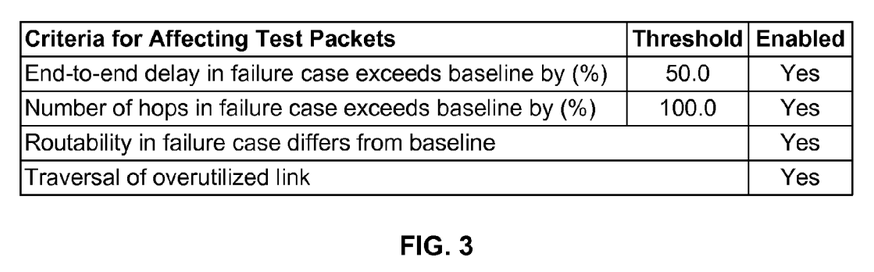
FIG. 3 illustrates an example user interface window for filtering data for reporting results of a survivability analysis in accordance with this invention.

FIG. 3 illustrates an example user interface that allows the user to define the thresholds used to determine the failure effects that are considered significant for the current analysis. As illustrated, the user is given the option of specifying a threshold for the cumulative delay along a new path from source to destination (end-to-end), as well as the number of hops along the new path. The user is also given the option of selectively enabling the consideration of each type of performance measure for the current analysis. In this example, it is assumed that all communication failures are significant; however, one of skill in the art will recognize that "communication failure" could be provided as a criterion that is also selectively enabled by the user. As discussed above, a communication failure includes an inability to find a new route, or an inability to satisfy select criteria, such as compliance with a Service Level Agreement (SLA).

In this example, the quantitative criteria are specified with respect to the fault-free baseline performance measures. Defining the criteria as a percentage over the baseline is generally preferred, because the baseline delay and/or hop count of the fault-free routes generally reflects what is expected and tolerable. An increase of a particular amount of delay, for example, may be more tolerable in a route that generally has a long delay than in a route that generally has a short delay. In this manner, the criteria identify measures that are abnormal, rather than merely large.

The third criterion is used to identify violations to specified security policies. If communications are not permitted between a given source-destination pair, but a fault condition at a device that had been blocking this communication allows them to communicate, this is a violation of the security policy. Faults that prevent devices that are permitted to communicate from communicating are also included within this performance category, although these communication failures could be segregated from the aforementioned undesirable communication 'successes'.

In a preferred embodiment, the pairs that are affected for each failure condition are recorded for subsequent report generation, with the corresponding performance measures for that failure condition.

One of skill in the art will recognize that the above described user specified thresholding and enabling may be performed when the performance measures are first determined, at 175, and only the measures that are significant enough to affect the source-destination pair are recorded at 176. In the preferred embodiment, recording all of the performance measures that differ from the baseline at 176 increases the amount of storage used, but allows the user to vary the thresholds and enablements for different reports without having to repeat the time-consuming process of 170-179.

Based on the above determinations of which source-destination pairs are affected by each failure condition, a number of statistics can be generated. The following statistics have been found to be particularly useful for assessing survivability and identifying problem areas.

Statistics related to source-destination pairs:
average, median, peak, and $95^{th}$ percentile cumulative delays for each source-destination pair across all simulated failure conditions;
average, median, peak, and $95^{th}$ percentile number of hops for each source-destination pair across all simulated failure conditions; and
survivability of each source-destination pair across all simulated failure conditions, wherein a pair is considered to be survivable only if it was not affected by any failure condition, based on the user-defined thresholds and enablements.

Statistics related to fault conditions:
average, median, peak, and $95^{th}$ percentile cumulative delays for all source-destination pairs for this failure conditions;
average, median, peak, and $95^{th}$ percentile number of hops for all source-destination pairs for this failure conditions; and
survivability with the fault condition, wherein the network is considered to be survivable with the fault condition only if none of the source-destination pairs were affected by the failure condition, based on the user-defined thresholds and enablements.

At 190 of FIG. 1, reports based on these statistics, and underlying details, are presented to the user using any of a variety of tools and formats. In a preferred embodiment, the user can select to have selections from the above statistics presented in any order, and, is provided the option of 'drilling down' to view the details behind any given statistic. Standard display options are also provided, such as a display of all non-survivable source-destination pairs, or a display of the fault conditions that cause the network to be non-survivable with the fault condition, with drill-down capabilities for viewing the details for each. For example, selecting a particular fault condition will enable a display of all of the source-destination pairs that were affected by the fault condition, and selecting a particular source-destination pair will enable a display of all of the fault conditions that affected the source-destination pair.

In a preferred embodiment, the user is provided options for customizing the presentation of the results of the survivability analysis. A particularly useful option includes allowing the user to define "groups" of source-destination pairs.

By grouping selected source-destination pairs using some user-defined criteria, their performance as a group can be viewed. For example, all of the source-destination pairs associated with a given pair of nodes, or a given pair of geographic sites, can be grouped, and statistics generated for the group. Preferably, all of the statistics related to individual source-destination pairs, discussed above, will be determined for each individual group across all fault conditions.

In addition to allowing the user to define groups, in a preferred embodiment, a set of 'standard' groups are available for selection by the user, including grouping by site, by VPN, by ports/applications, and so on.

In a preferred embodiment, the user is provided the option of defining criteria to be applied to determine whether a group is 'affected' by each fault condition. For example, a group can be considered affected if a specified percentage of the pairs within the group are affected, and/or if a specified percentage of the pairs within the group experience communication failures, and so on.

The grouping of source-destination pairs for reporting allows for the presentation of this data in variety of forms. For example, the delays and/or hop counts can be presented as a histogram, graph, and so on, for any given group, where the user can select specific groups of interest.

Of particular note, in a typical survivability analysis, the number of source-destination pairs will be very large, whereas the number of groups will be much smaller, allowing the information to be better perceived and appreciated by the user.

Figure 4:
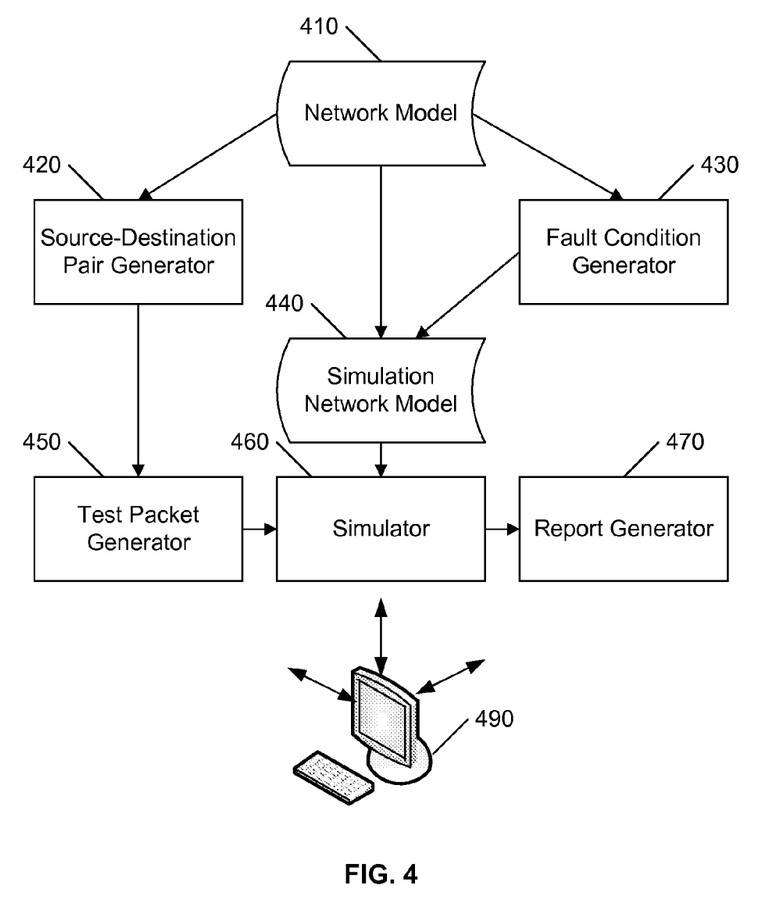
FIG. 4 illustrates an example block diagram of a survivability analysis system in accordance with this invention.

FIG. 4 illustrates an example block diagram of a survivability analysis system that embodies the various aspects of this invention. A user controls the operation of the various components of the system via a user interface 490, as discussed above.

A network model 410 describes the elements and topology of the network being analyzed. In accordance with one aspect of this invention, the user identifies interfaces of interest, and a source-destination pair generator 420 defines each distinguishable source-destination address range and selects a source-destination pair within each range. For each distinguished source-destination pair, a test packet generator 450 generates a packet for propagation from the source to the destination via a network simulator 460.

In accordance with another aspect of this invention, a fault-condition generator 430 identifies fault conditions that are likely to have a significant effect on the performance of the interfaces of interest, based, for example, on a simulation of the test packets for each source-destination pair. The fault-condition generator 430 is configured to modify the network model to represent each selected fault condition for simulation.

The simulator 460 is configured to propagate the test packets from source to destination under each selected fault condition. As detailed above, the simulator 460 is configured to simulate only the test packets of source-destination pairs that are able to be directly affected by the fault condition being modeled, and records any changes to performance measures of each pair under the fault condition relative to the fault-free condition.

A report generator 470 processes the results of the simulation to provide select survivability reports to the user. As discussed above, in a preferred embodiment, the user is provided the option of defining fault-induced performance effects that are considered significant enough for reporting, and is able to define groups of source-destination pairs to customize the reports for particular analyses.

The above describes the advantages that can be gained by selecting particular interface-pairs of interest and particular failure conditions of interest. Even with such selection, however, a typical survivability analysis of a large network can be expected to include hundreds or thousands of source-destination pairs and hundreds of failure conditions. As such, a variety of memory-saving, and/or computation-saving techniques are preferably used.

If the path used by each source-destination pair for each fault condition is recorded directly, an exorbitant amount of storage would be required. It is noted that for a given source-destination pair, the number of alternative routes is generally limited, as the same path may be used under many failure conditions. The amount of data required to store a path is substantially larger than the amount of data required to store an identification of the path. Therefore, in a preferred embodiment, each unique path that is generated is stored, and an equivalence class of all of the fault conditions that cause a source-destination pair to take that route is maintained. Further, the packet-independent performance measures are stored with each route, so that these measures do not need to be recomputed each time the source-destination pair is caused to take the route.

In a further extension of this concept, it is noted that the above equivalence class for each baseline path for each source-destination pair will contain all of the fault conditions that do not affect the source-destination pair. In a preferred embodiment, if a fault condition results in no change to the baseline path, that fault condition is not explicitly stored in the equivalence class. During the reporting phase, if a fault condition is not found in any equivalence class for a given source-destination pair, it is known to be an absent member of the baseline equivalence class, using the path and having the performance measures of the baseline path.

In another extension of this concept, it is noted that source-destination pairs that are associated with the same interface pair, but having different IP or port address ranges, are generally routed along the same route, except when the factor that distinguishes these source-destination pairs comes into play. For example, one range of interface-pair addresses (one source-destination pair) may be permitted to communicate, whereas another range of addresses of the interface-pair (another source-destination pair) may be prohibited from communication. The enforcement of the prohibitive communication policy may be located at an edge router to a local network, all of the other nodes along the paths being unaware of the policy. In this case, the routes from the source to this edge router will be equivalent for both source-destination pairs. By maintaining an equivalence class that includes both source-destination pairs, a single set of paths can be used for both pairs for all failure conditions that do not distinguish between the addresses of the pairs.

In each of the above optimizations, no information is lost between the exhaustive storage of each path of each source-destination pair for each fault condition. Other storage optimizations can be used if less information is acceptable. For example, as discussed above, if the particular path that each source-destination pair uses under each fault condition is of minor or no interest, significant storage savings can be achieved by only storing the performance measures; and also only storing the performance measures that are different from the baseline, or only storing the performance measures that exceed user-defined criteria.

Further savings can be achieved if the association of which fault condition caused which performance measure is of little or no interest. In this case, the performance data can be recorded as an aggregate. In the extreme case, the source-destination pair need only record the number of times it was affected by a fault condition, and/or the fault condition need only record the number of source-destination pairs that it affected. In another case, the source destination pair can record a histogram regarding the number of hops, or ranges of cumulative delay, incurred by each fault condition. In like manner, a running average of the cumulative delay incurred by each fault condition can be recorded. These and other techniques for minimizing storage requirements by recording only the information of interest will be apparent to one of skill in the art in view of this disclosure.

The foregoing merely illustrates the principles of the invention. It will thus be appreciated that those skilled in the art will be able to devise various arrangements which, although not explicitly described or shown herein, embody the principles of the invention and are thus within the spirit and scope of the following claims.

In interpreting these claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) each of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise;

h) no specific sequence of acts is intended to be required unless specifically indicated; and i) the term "plurality of" an element includes two or more of the claimed element, and does not imply any particular range of number of elements; that is, a plurality of elements can be as few as two elements, and can include an immeasurable number of elements.

We claim:

1. A method comprising:
   identifying, on a network analysis machine, a set of source-destination pairs of a modeled network,
   creating, on the network analysis machine, a plurality of test packets, each test packet corresponding to a source-destination pair of the set of source-destination pairs,
   simulating, on the network analysis machine, propagation of each test packet from source to destination of the corresponding source-destination pair to determine a fault-free routing path,
   identifying, on the network analysis machine, a set of fault conditions to model on the modeled network,
   simulating, on the network analysis machine, each fault condition to determine if any new paths for the set of source-destination pairs is caused by the fault condition,
   determining, on the network analysis machine, one or more performance measures corresponding to each new path, and
   providing, on the network analysis machine, one or more reports based on the performance measures of the new paths.

2. The method of claim 1, including receiving user input to facilitate identifying the set of source-destination pairs.

3. The method of claim 2, wherein the user input identifies interfaces of interest and the set of source-destination pairs corresponds to distinguishable address ranges between pairs of the interfaces.

4. The method of claim 1, wherein the simulating of each fault condition includes simulating only source-destination pairs that can be directly affected by the fault condition.

5. The method of claim 1, wherein the performance measures include a number of hops in the new path.

6. The method of claim 1, wherein the performance measures include a cumulative delay across the new path.

7. The method of claim 1, including determining fault-free performance measures corresponding to the fault-free path, and wherein the reports are based on differences between the fault-free performance measures and the performance measures of the new paths.

8. The method of claim 7, including identifying, by a user, differences that are considered to be significant differences, and wherein the reports are based on the significant differences.

9. The method of claim 8, including receiving user input to facilitate identifying the significant differences.

10. The method of claim 9, wherein the significant differences are differences that exceed a given threshold.

11. The method of claim 8, wherein the significant differences are differences that exceed a given threshold.

12. The method of claim 1, wherein identifying the set of fault conditions is based on levels of utilization of elements in the modeled network among the fault-free routing paths.

13. The method of claim 1, wherein identifying the set of fault conditions is based on likelihoods of each fault condition causing new paths for multiple source-destination pairs.

14. The method of claim 1, wherein the new paths are stored for each source-destination pair using equivalence classes.

15. The method of claim 1, wherein the performance measures include a histogram that is updated when a new path is caused by the failure condition.

16. The method of claim 1, wherein the performance measures include an average that is updated when a new path is caused by the failure condition.

17. The method of claim 1, wherein the reports are based on groups of source-destination pairs.

18. The method of claim 17, including receiving user input to facilitate defining the groups of source-destination pairs.

19. The method of claim 1, wherein each source-destination pair corresponds to a single test packet.

20. A system comprising:
   a pair generator that is configured to identify a set of source-destination pairs of a modeled network,
   a test packet generator that is configured to create a plurality of test packets, each test packet corresponding to a source-destination pair of the set of source-destination pairs,
   a simulator that is configured to simulate propagation of each test packet from source to destination of the corresponding source-destination pair to determine a fault-free routing path, a fault condition generator that is configured to identify a set of fault conditions to model on the modeled network, and a report generator, wherein the simulator is configured to simulate each fault condition to determine if any new paths for the set of source-destination pairs is caused by the fault condition, and to determine one or more performance measures corresponding to each new path, and the report generator is configured to provide one or more reports based on the performance measures of the new paths.

21. The system of claim 20, including a system interface that is configured to receive user input to facilitate identifying the set of source-destination pairs.

22. The system of claim 21, wherein the user input identifies interfaces of interest and the set of source-destination pairs corresponds to distinguishable address ranges between pairs of the interfaces.

23. The system of claim 20, wherein the simulator is configured to simulate each fault condition by simulating only source-destination pairs that can be directly affected by the fault condition.

24. The system of claim 20, wherein the performance measures include a number of hops in the new path.

25. The system of claim 20, wherein the performance measures include a cumulative delay across the new path.

26. The system of claim 20, wherein the simulator is configured to determine fault-free performance measures corresponding to the fault-free path, and the reports are based on differences between the fault-free performance measures and the performance measures of the new paths.

27. The system of claim 26, wherein the report generator is configured to allow a user to identify differences that are considered to be significant differences, and wherein the reports are based on the significant differences.

28. The system of claim 27, including a user interface that is configured to receive user input to facilitate identifying the significant differences.

29. The system of claim 28, wherein the significant differences are differences that exceed a given threshold.

30. The system of claim 27, wherein the significant differences are differences that exceed a given threshold.

31. The system of claim 20, wherein the fault condition generator is configured to identify the set of fault conditions based on levels of utilization of elements in the modeled network among the fault-free routing paths.

32. The system of claim 20, wherein the fault condition generator is configured to identify the set of fault conditions based on likelihoods of each fault condition causing new paths for multiple source-destination pairs.

33. The system of claim 20, wherein the new paths are stored for each source-destination pair using equivalence classes.

34. The system of claim 20, wherein the performance measures include a histogram that is updated when a new path is caused by the failure condition.

35. The system of claim 20, wherein the performance measures include an average that is updated when a new path is caused by the failure condition.

36. The system of claim 20, wherein the reports are based on groups of source-destination pairs.

37. The system of claim 36, including a user interface that is configured to receive user input to facilitate defining the groups of source-destination pairs.

38. The system of claim 20, wherein each source-destination pair corresponds to a single test packet.

39. A non-transitory computer readable medium upon which is stored a computer program that causes a computer system to:

identify a set of source-destination pairs of a modeled network, create a plurality of test packets, each test packet corresponding to a source-destination pair of the set of source-destination pairs, simulate propagation of each test packet from source to destination of the corresponding source-destination pair to determine a fault-free routing path, identify a set of fault conditions to model on the modeled network, simulate each fault condition to determine if any new paths for the set of source-destination pairs is caused by the fault condition, determine one or more performance measures corresponding to each new path, and provide one or more reports based on the performance measures of the new paths.

40. The medium of claim 39, wherein the set of source-destination pairs corresponds to distinguishable address ranges between pairs of interfaces.

* * * * *